United States Patent [19]
Jeong et al.

[11] Patent Number: 5,692,383
[45] Date of Patent: Dec. 2, 1997

[54] COOL AIR DISCHARGE CONTROLLER FOR REFRIGERATOR AND CONTROLLING METHOD THEREOF

[75] Inventors: Seong-wook Jeong, Suwon; Jae-in Kim, Seoul; Yun-seog Kang, Suwon; Suk-hang Park, Suwon; Yong-myoung Kim, Suwon, all of Rep. of Korea

[73] Assignee: Samsung Electronics Co., Ltd., Suwon, Rep. of Korea

[21] Appl. No.: 563,126

[22] Filed: Nov. 29, 1995

[30] Foreign Application Priority Data

| Nov. 30, 1994 | [KR] | Rep. of Korea | 94-32115 |
| Dec. 10, 1994 | [KR] | Rep. of Korea | 94-33558 |
| Oct. 16, 1995 | [KR] | Rep. of Korea | 95-35671 |

[51] Int. Cl.$^6$ .................................. F25D 17/08
[52] U.S. Cl. ...................... 62/89; 62/186; 236/49.3
[58] Field of Search ............... 62/89, 186, 187, 62/180, 177; 236/49.3, 51; 454/256, 258

[56] References Cited

U.S. PATENT DOCUMENTS

| 4,671,458 | 6/1987 | Fukuda et al. | 236/49.3 |
| 5,251,814 | 10/1993 | Warashina et al. | 62/186 X |
| 5,331,825 | 7/1994 | Kim | 62/180 |

Primary Examiner—Harry B. Tanner
Attorney, Agent, or Firm—Burns, Doane, Swecker & Mathis LLP

[57] ABSTRACT

A cool air discharge controller for a refrigerator and a controlling method thereof are provided. The cool air discharge controller includes: a front panel member which is installed at the rear wall of a refrigeration compartment of the refrigerator for providing a plurality of cool air discharge apertures; a rotary cool air discharge member detachably installed onto the front panel member, for dispersedly discharging the cool air into the refrigeration compartment; a driving motor installed at the upper portion of the rotary cool air discharge member for driving the rotary cool air discharge member; a position detecting switch installed at the upper portion of the rotary cool air discharge member, for defining a reference position of the rotary cool air discharge member; a grill cover detachably coupled to the front of the front panel member, for protecting the rotary cool air discharge member and guiding the cool air to be discharged; a thermal insulating member coupled at the rear side of the front panel member, for providing a loading position of a cool air guiding portion of the rotary cool air discharge member and a cool air flowing path; a damper baffle installed at the upper portion of the thermal insulating member, for controlling the amount of the cool air introduced into the refrigeration compartment; and a seal panel member coupled at the rear side of the thermal insulating member, for protecting the thermal insulating member by constituting a housing in cooperation with the front panel member. Thus, the cool air is dispersedly discharged by the rotary cool air discharge member.

5 Claims, 16 Drawing Sheets

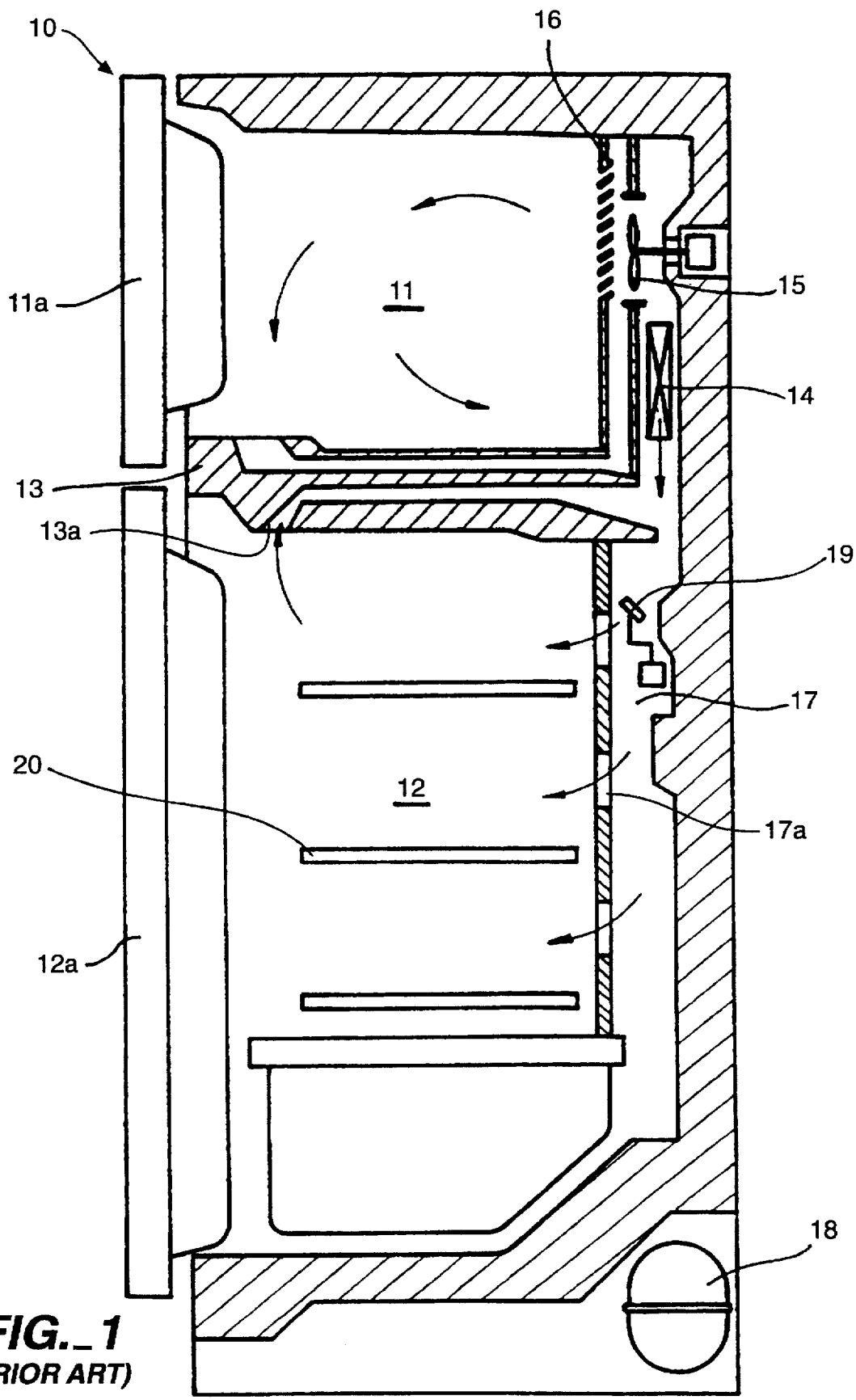
FIG._1
*(PRIOR ART)*

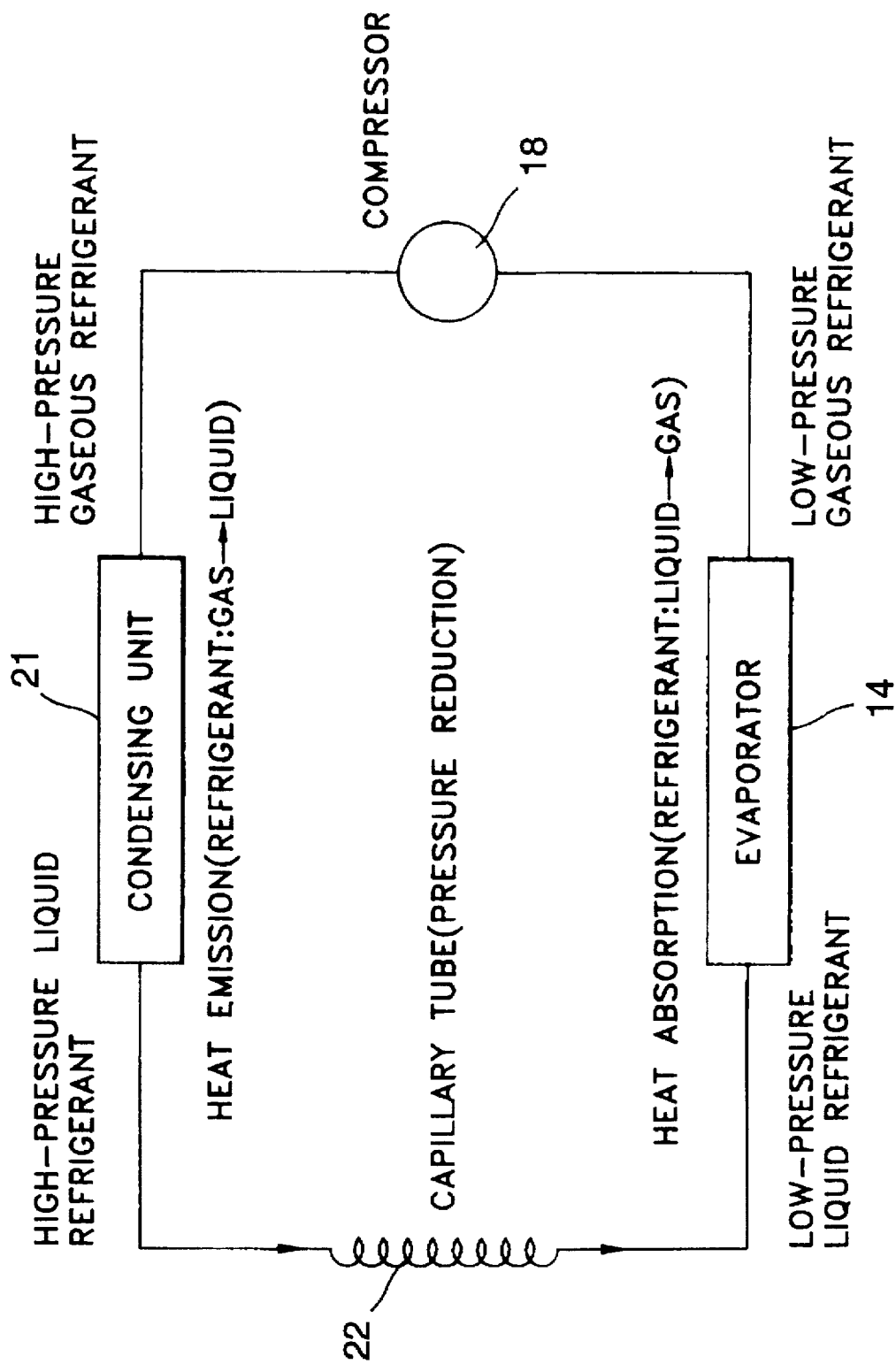
FIG._2

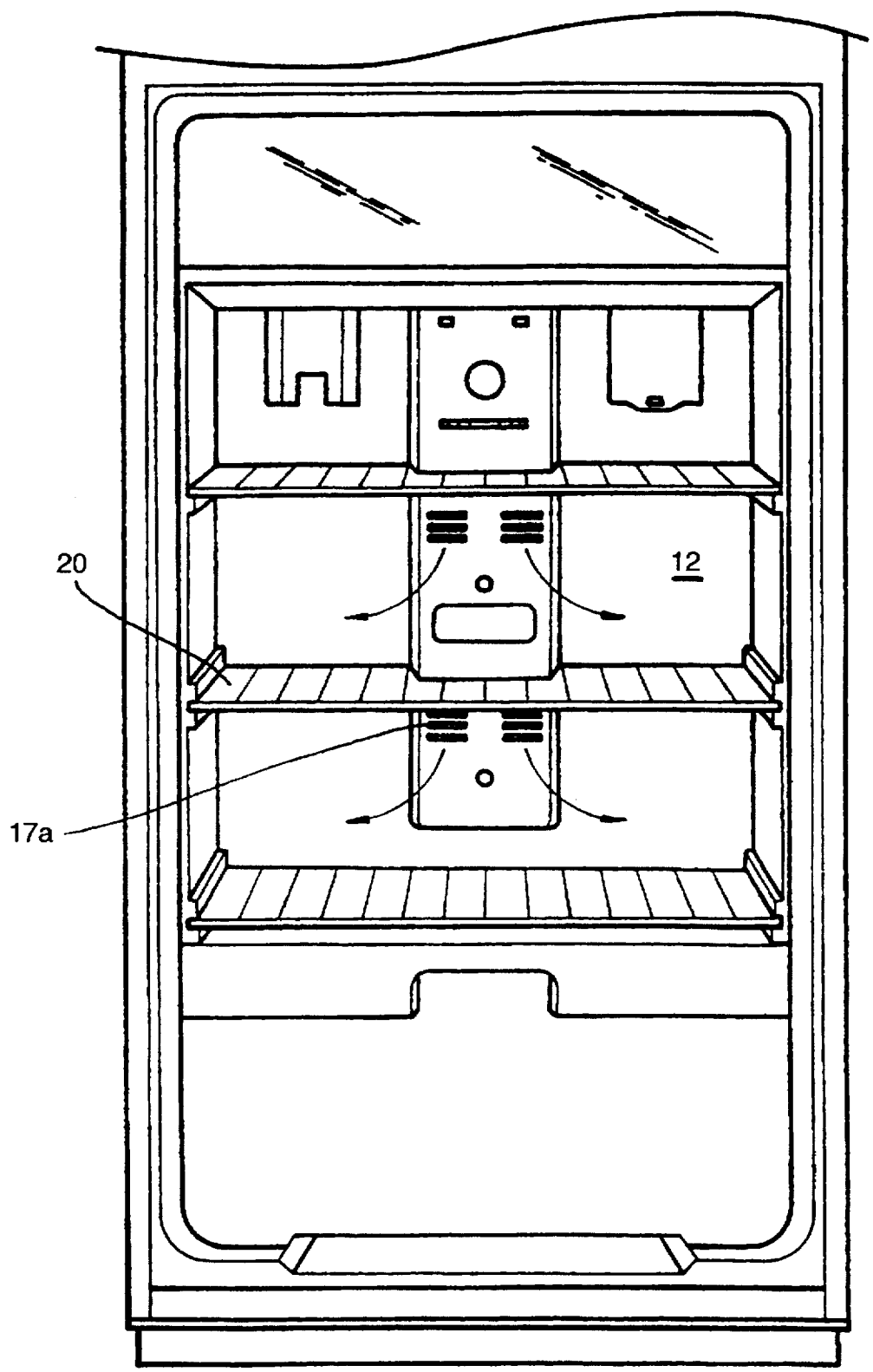
FIG._3
*(PRIOR ART)*

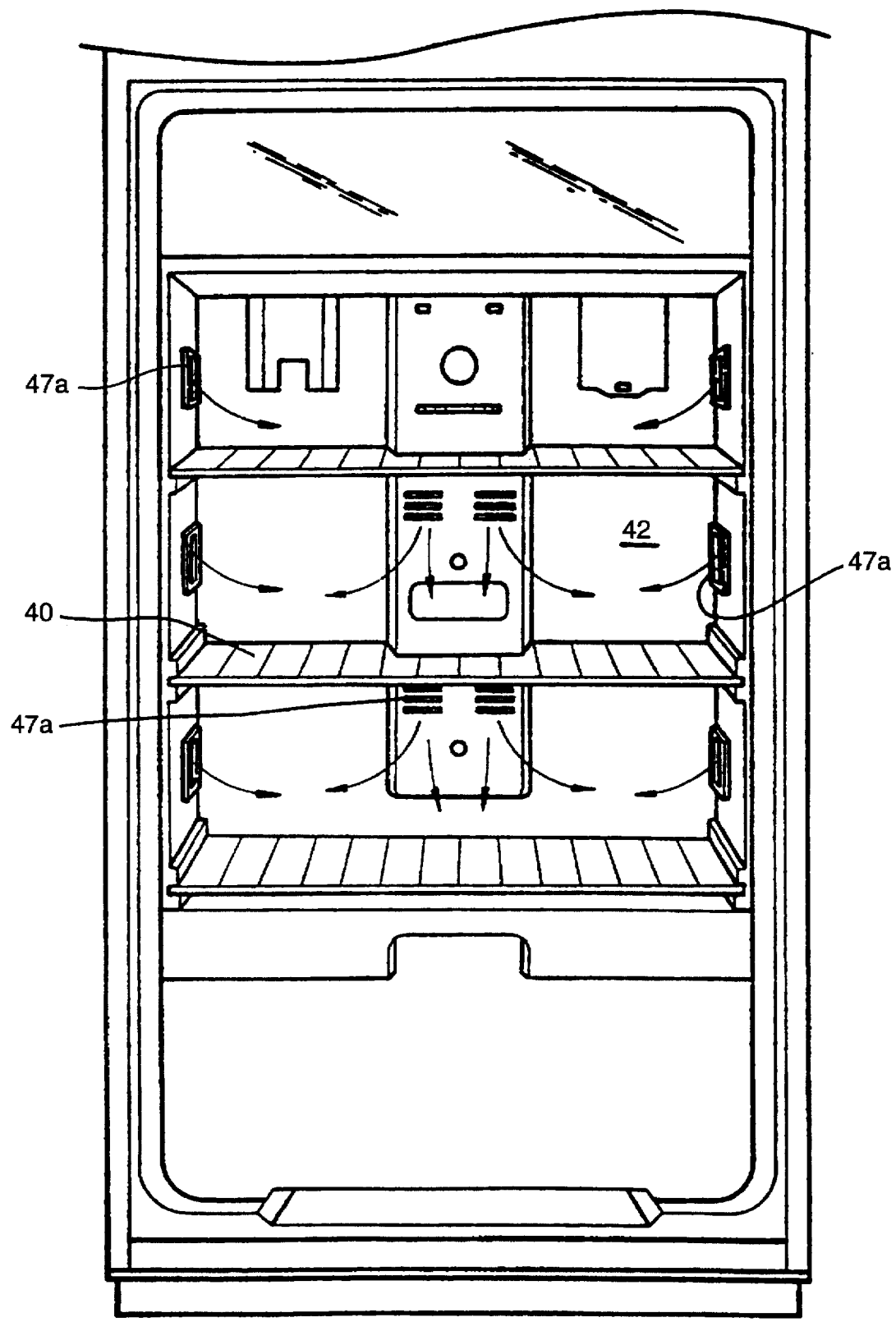
FIG._4
*(PRIOR ART)*

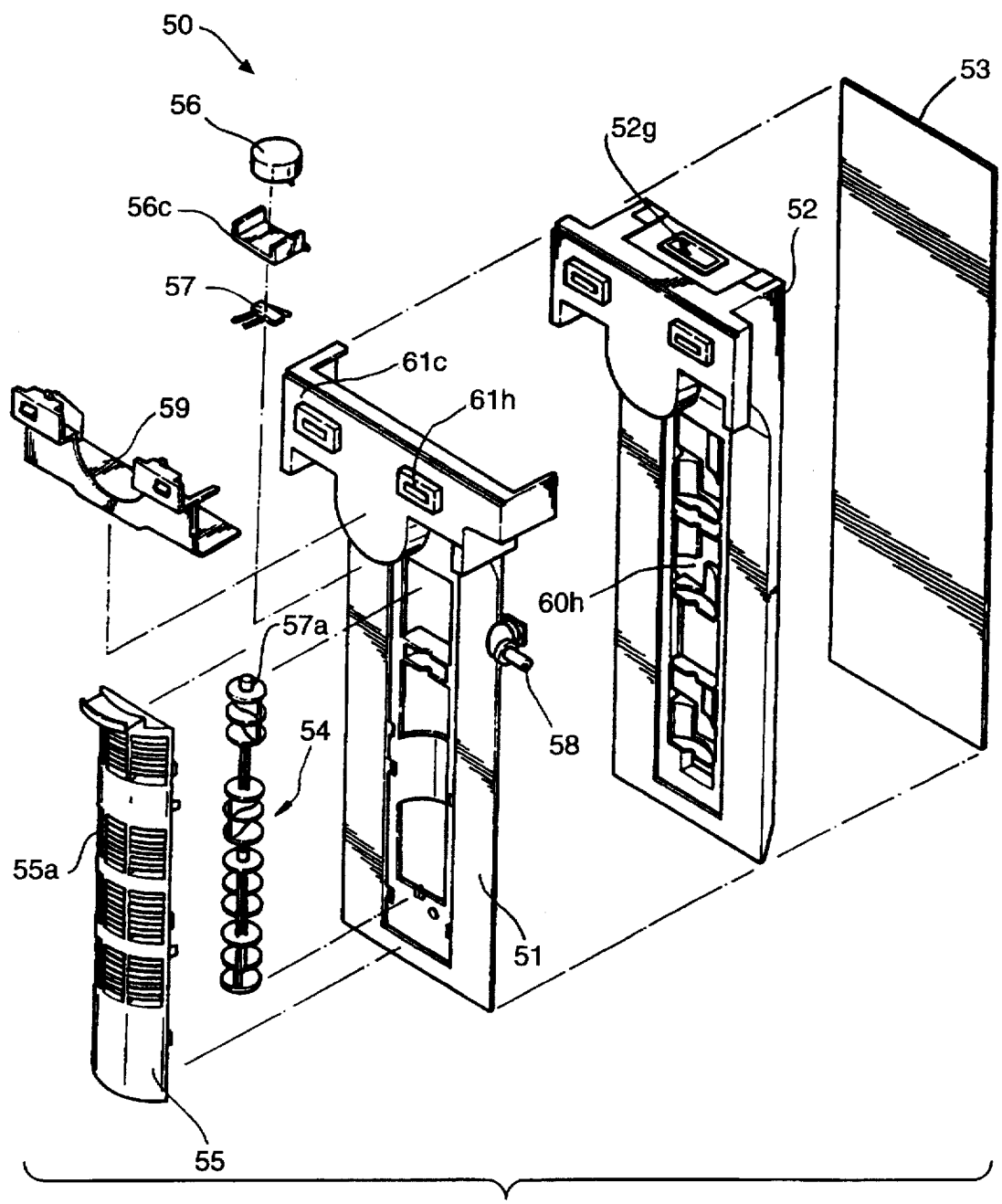
FIG._5

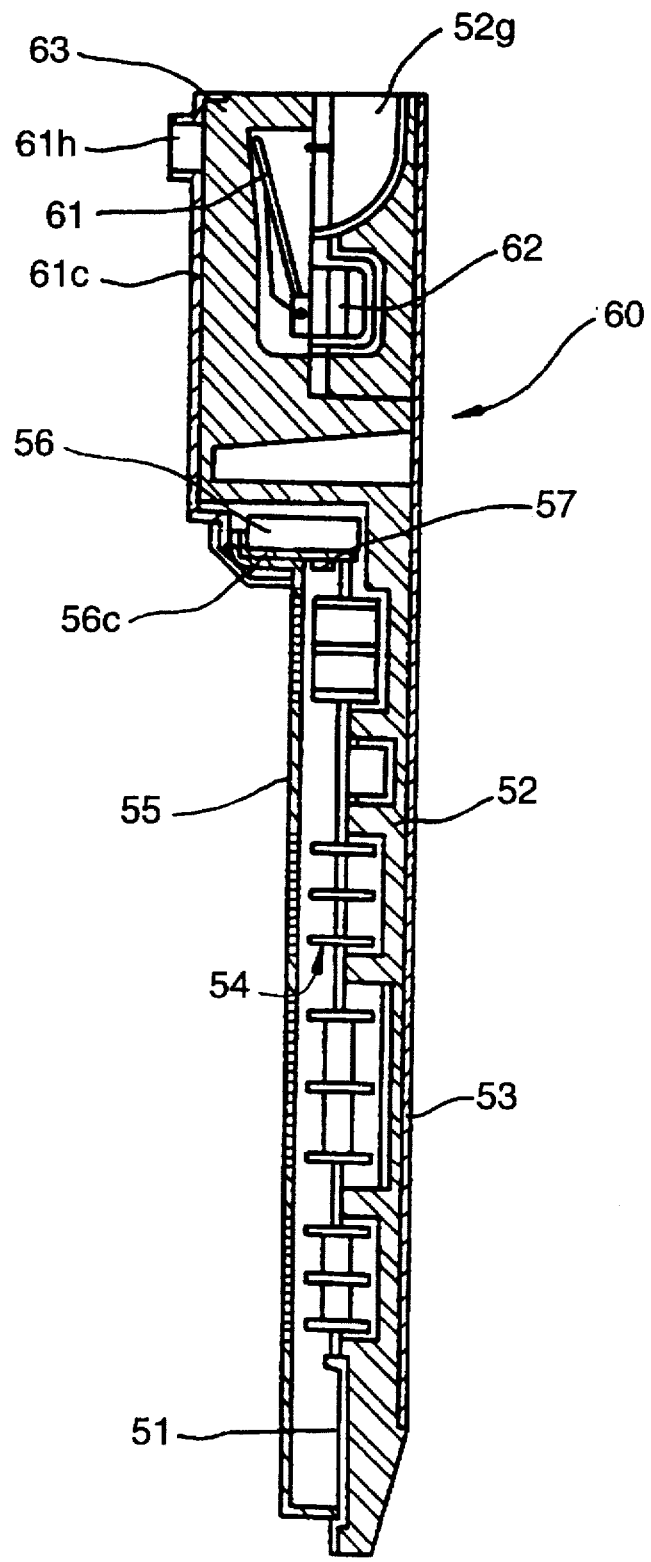
FIG._6

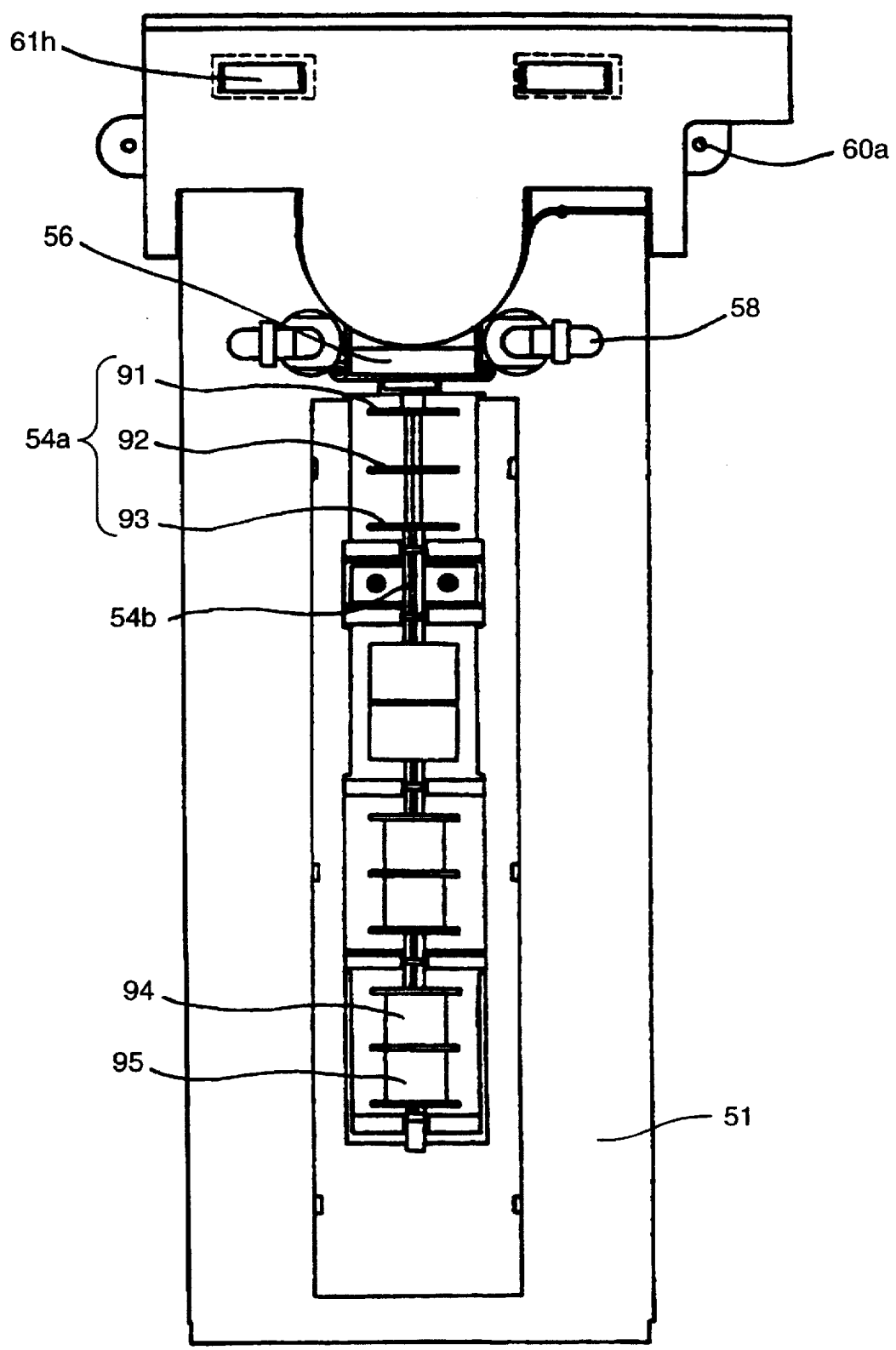
FIG._7

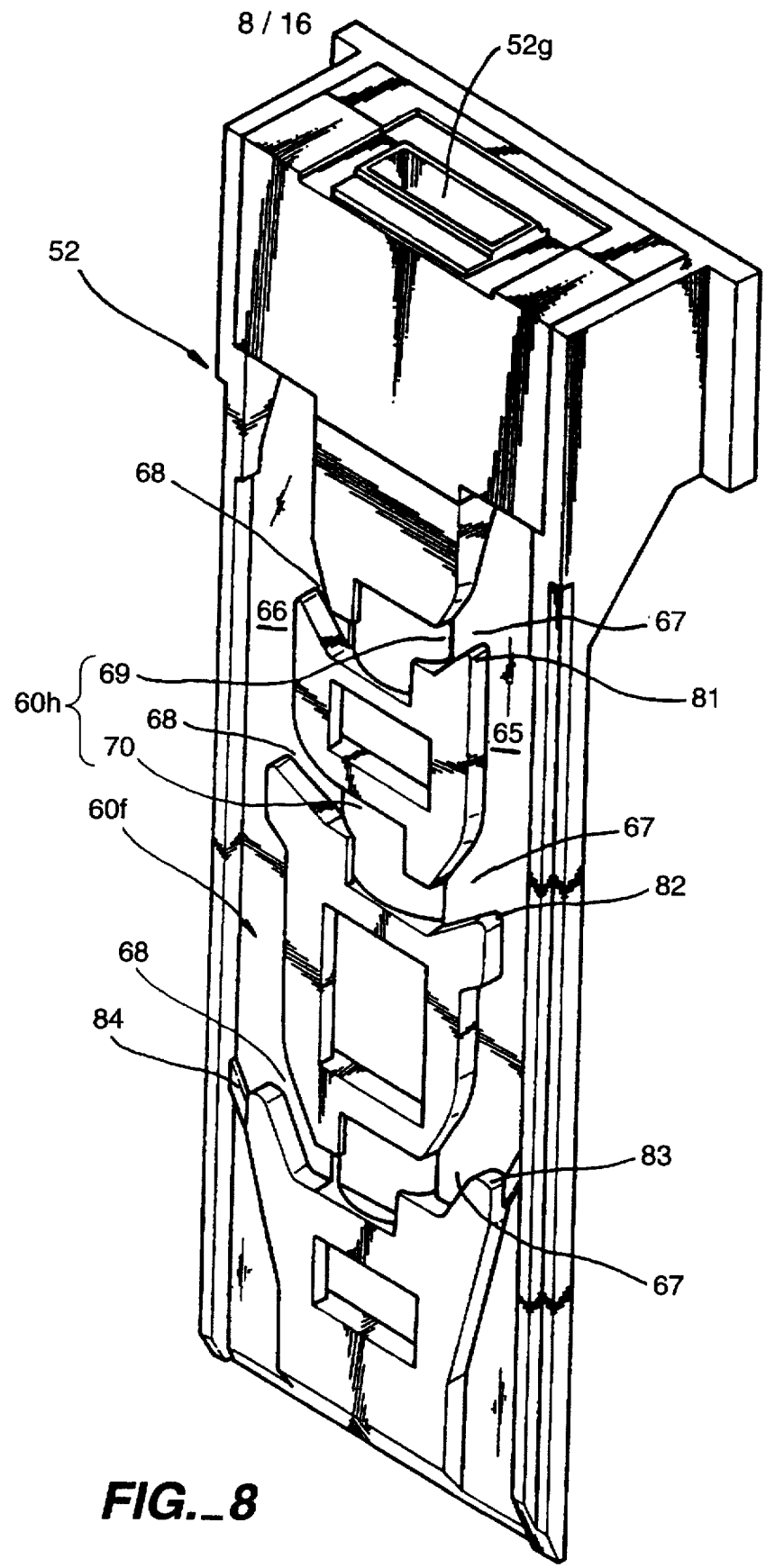
FIG._8

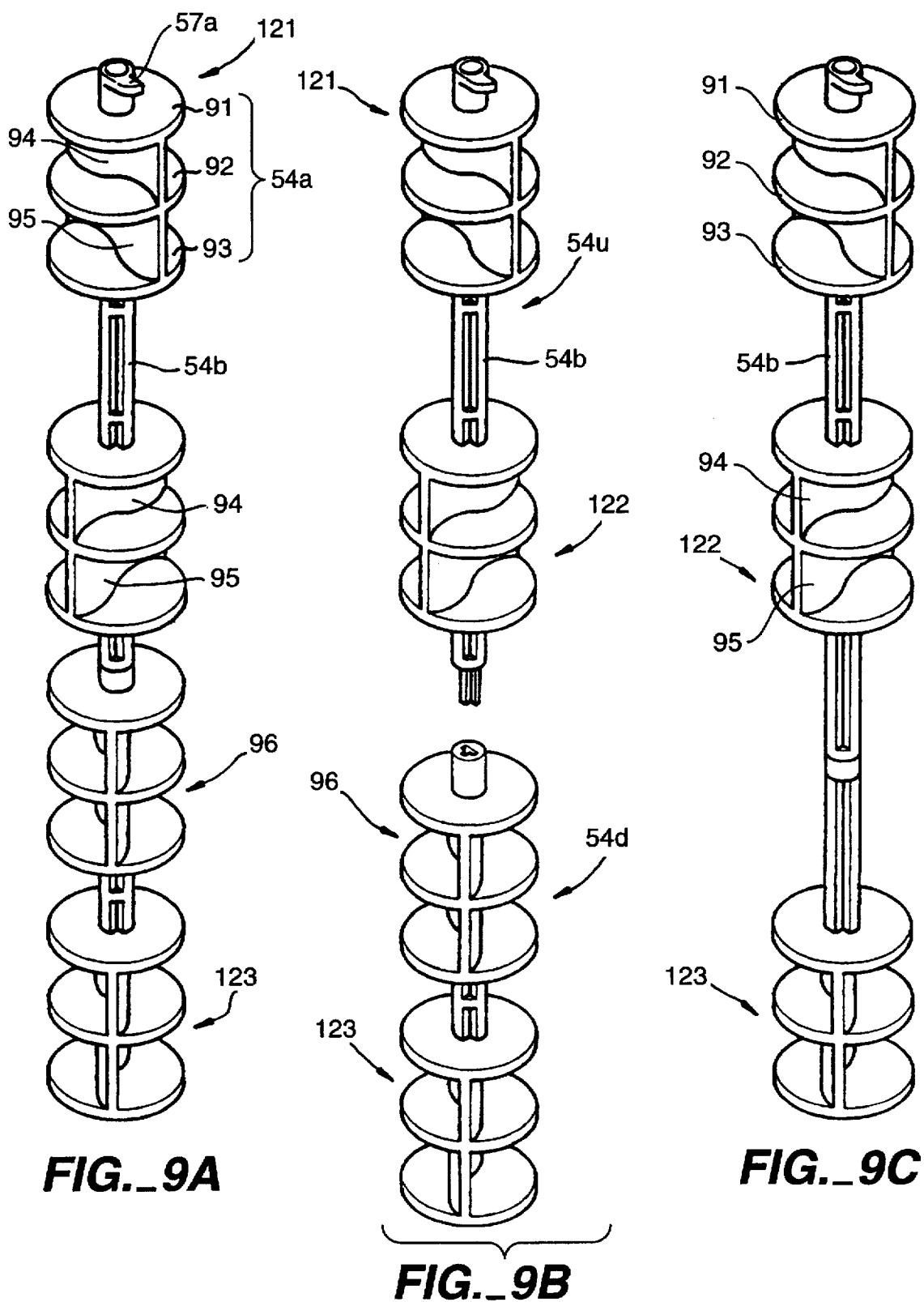
FIG._9A    FIG._9B    FIG._9C

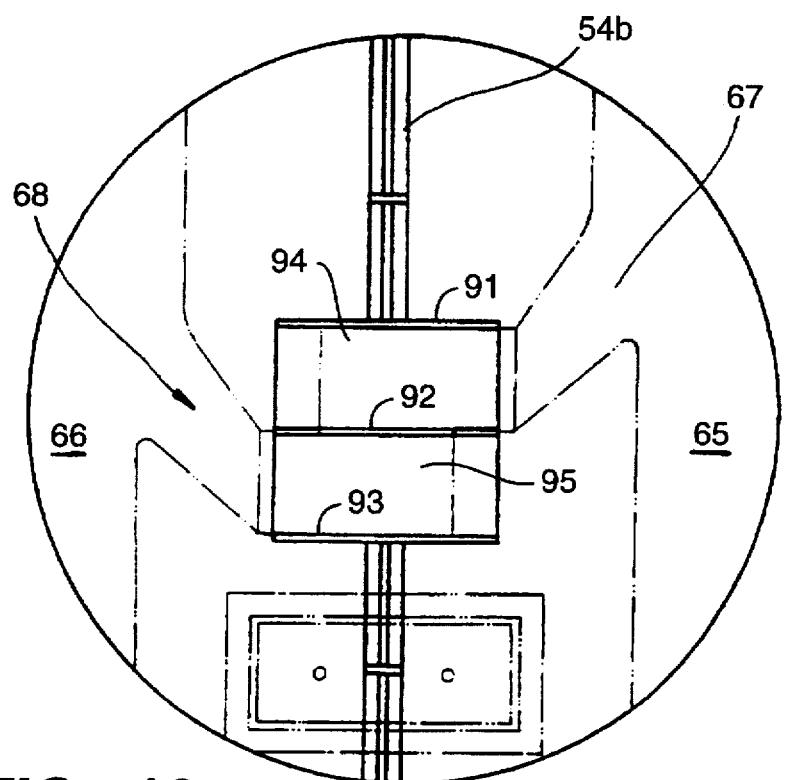
FIG._10
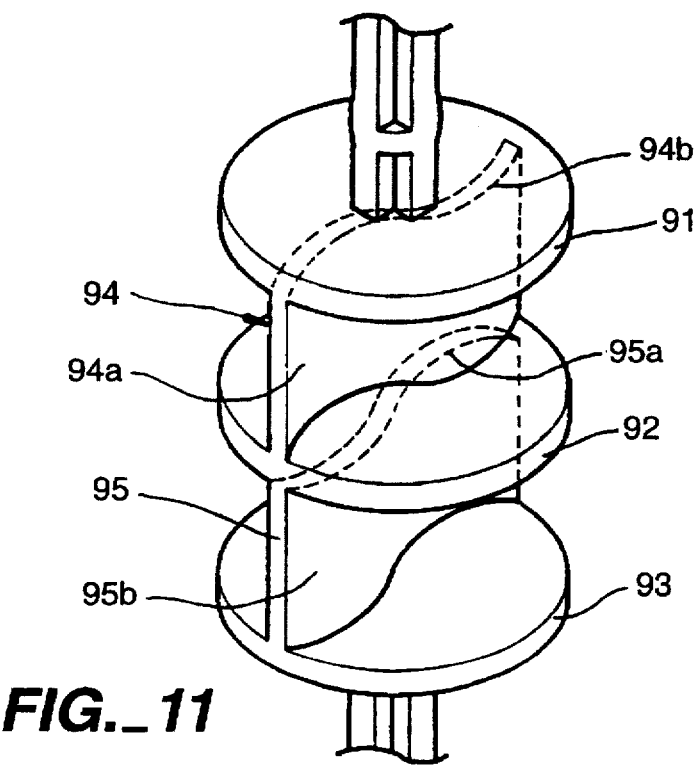
FIG._11

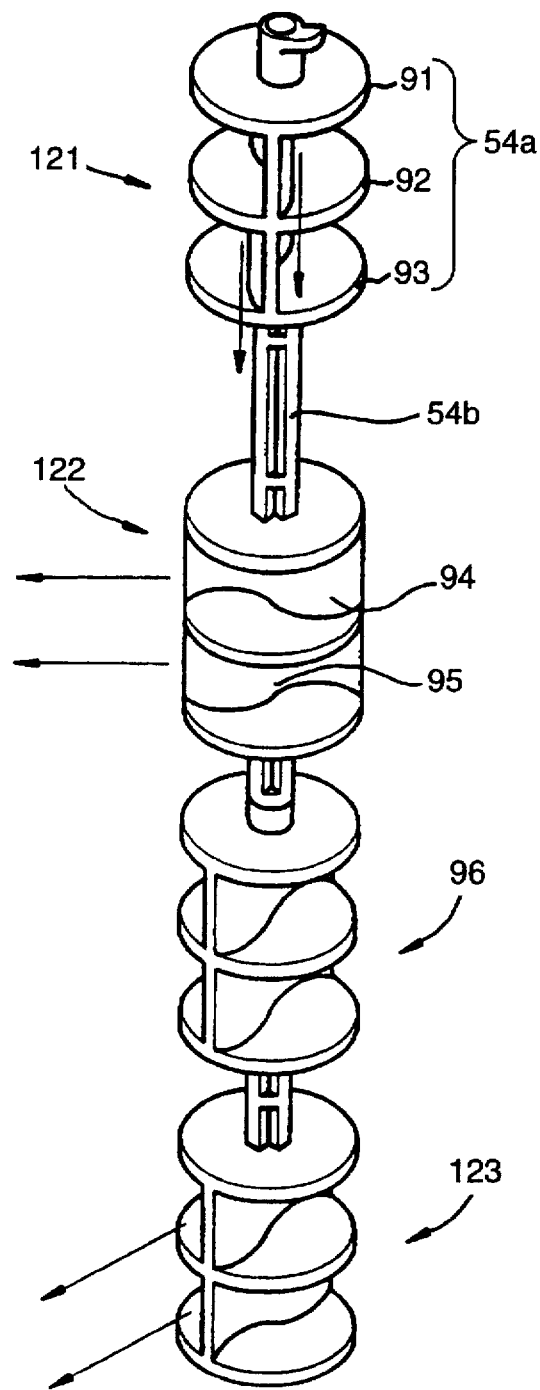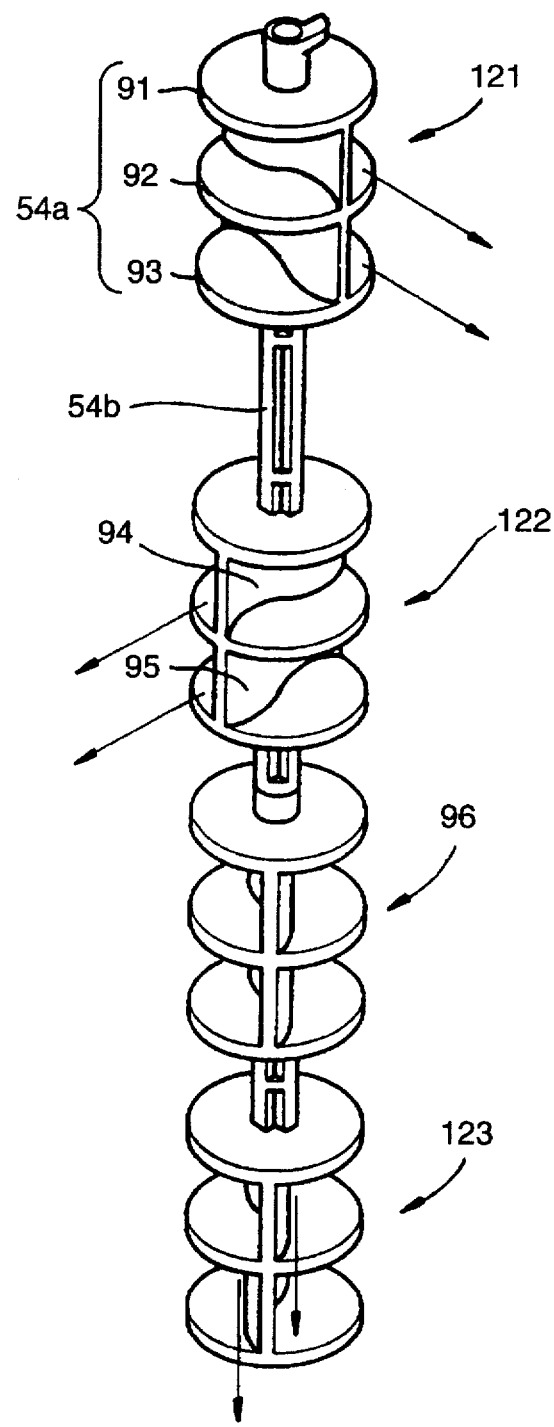
FIG._12A  FIG._12B

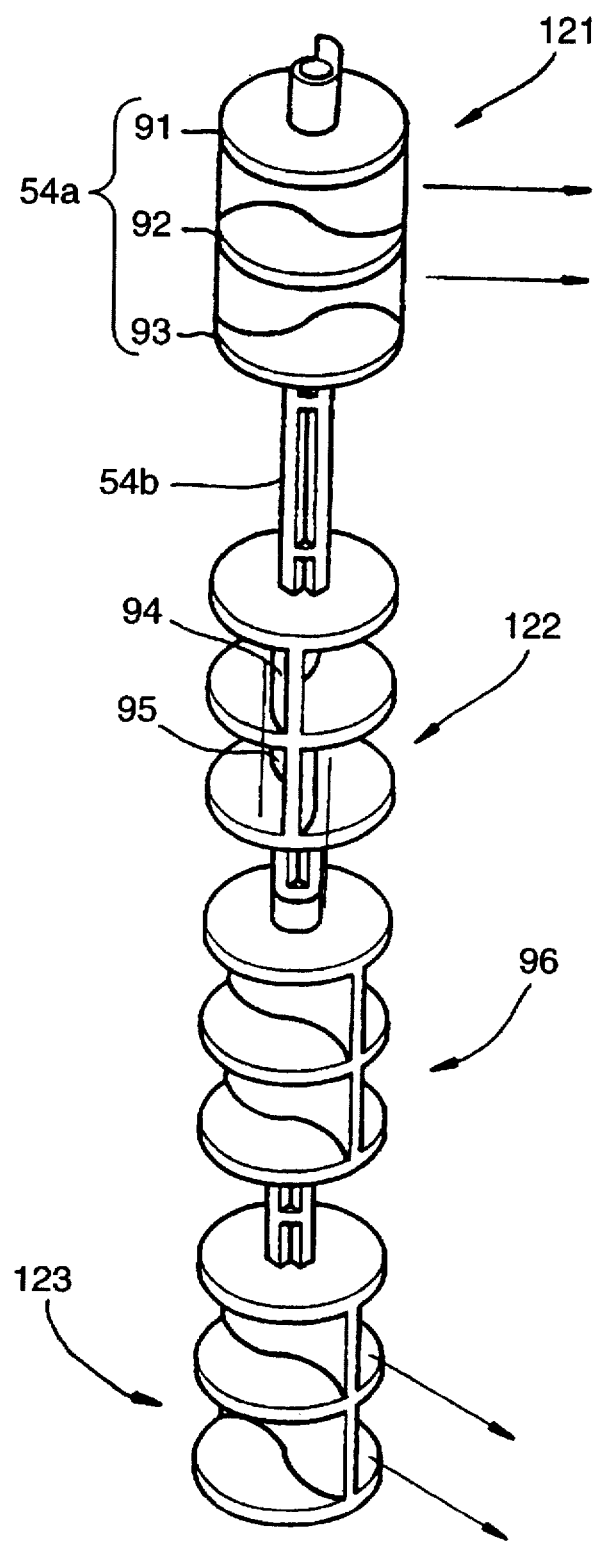
FIG._12C

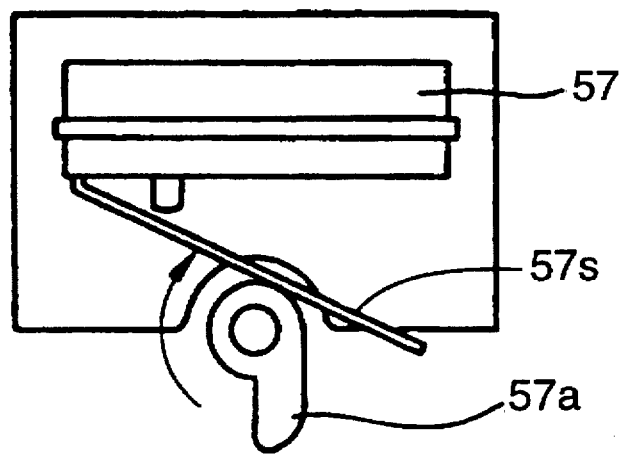
FIG._13A
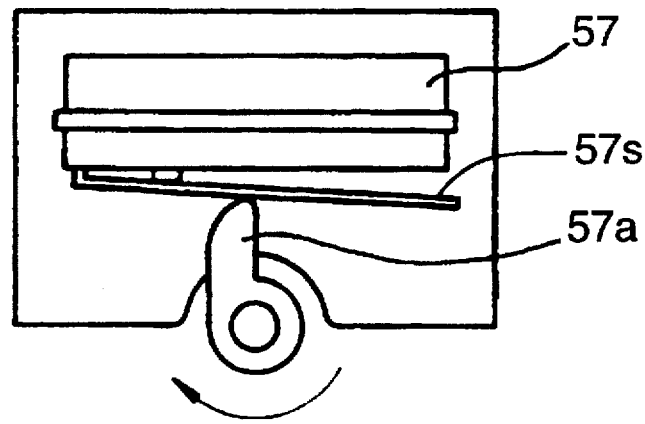
FIG._13B
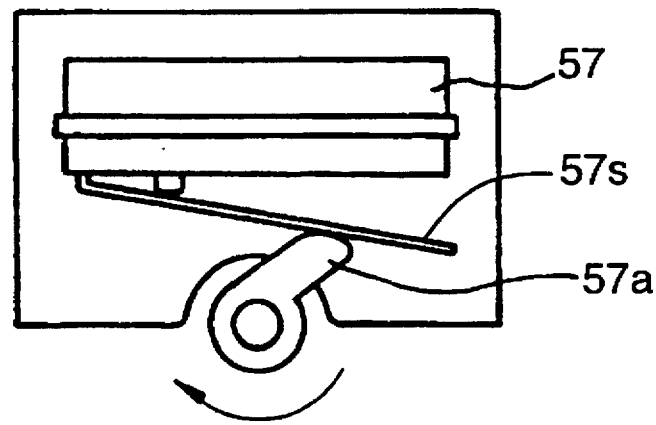
FIG._13C

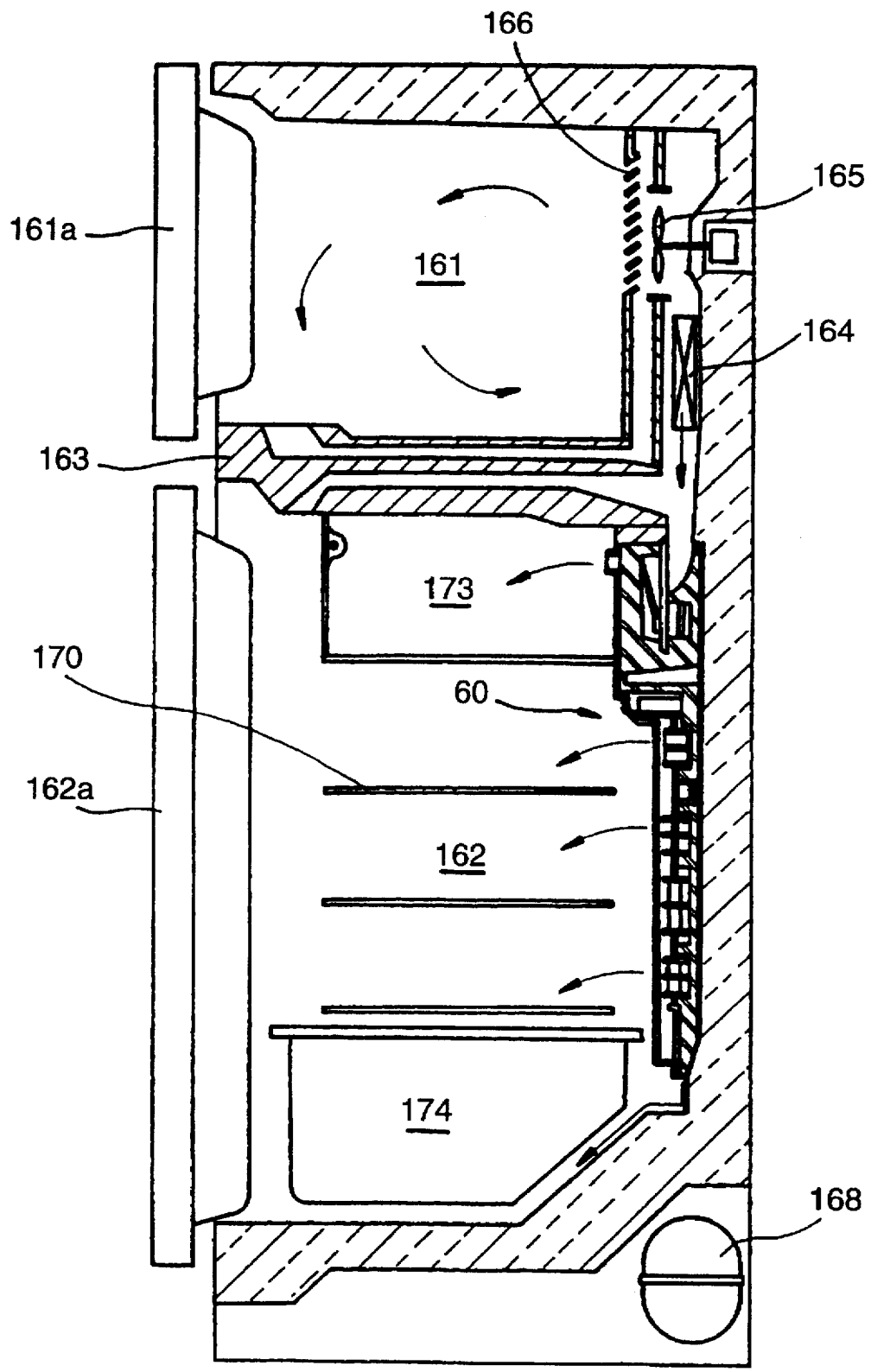
FIG._14

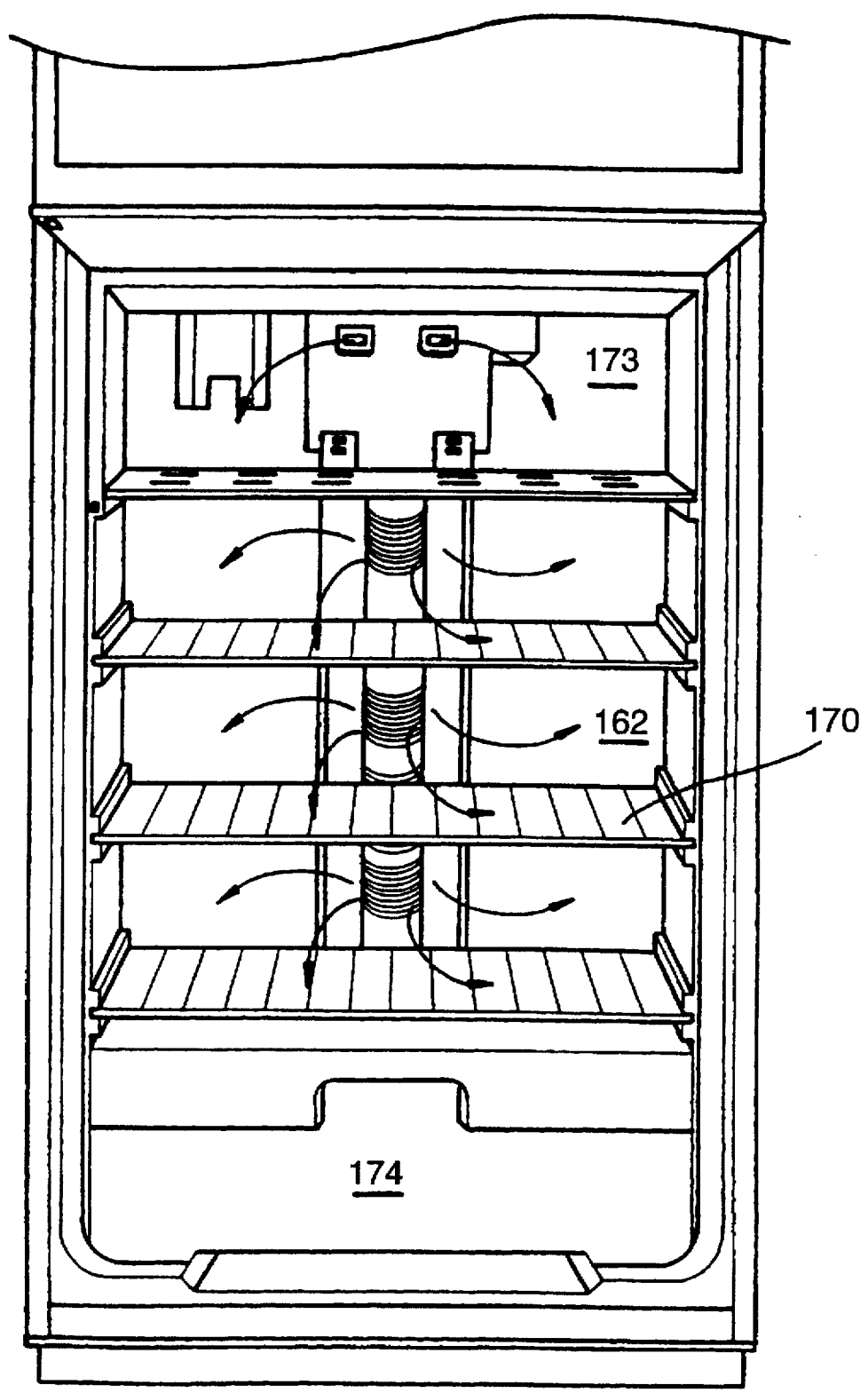
FIG._15

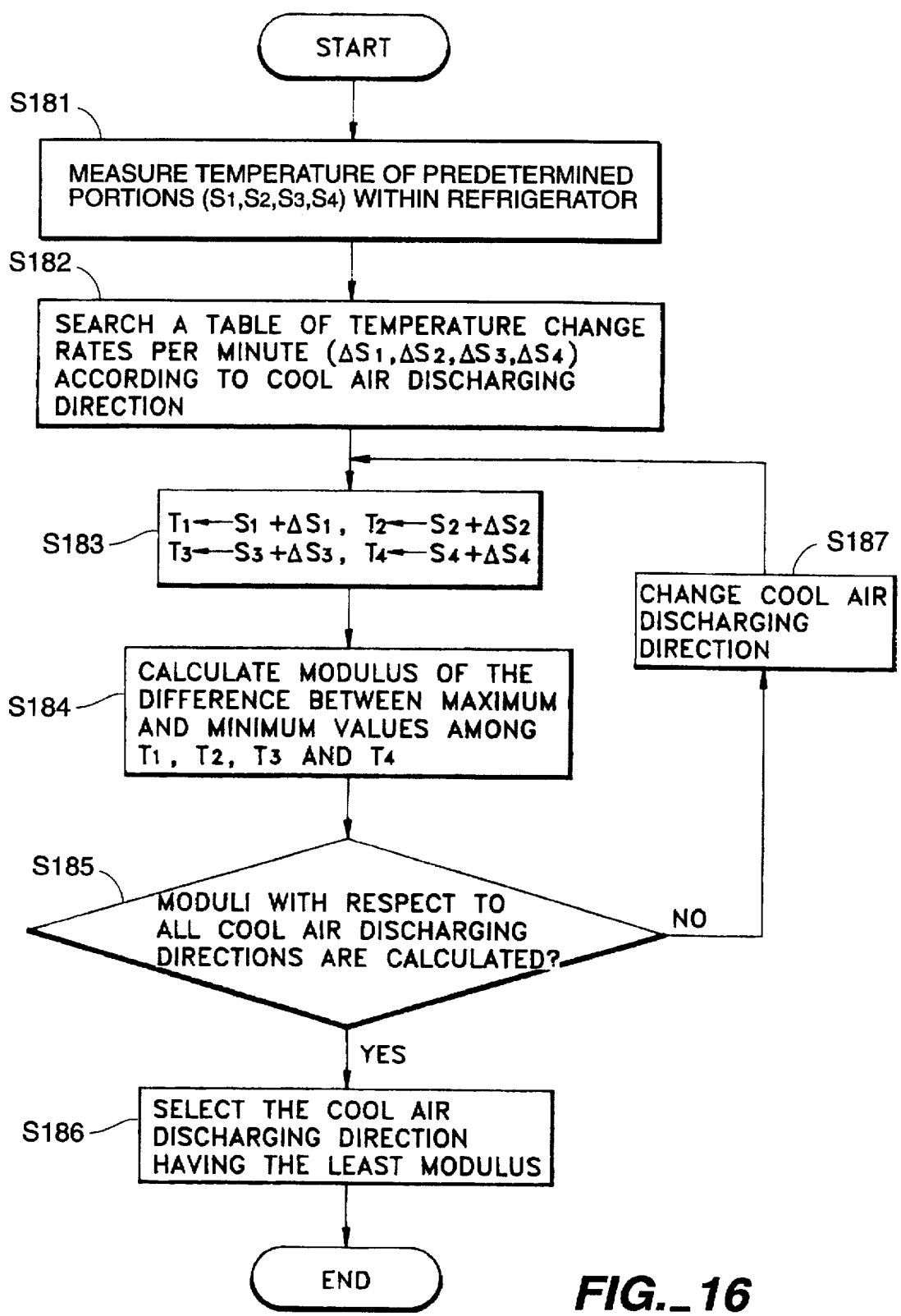
FIG._16

COOL AIR DISCHARGE CONTROLLER FOR REFRIGERATOR AND CONTROLLING METHOD THEREOF

BACKGROUND OF THE INVENTION

The present invention relates to a cool air discharge controller used for a refrigerator and a controlling method thereof, and more particularly to, a cool air discharge controller for evenly controlling the temperature distribution within the refrigerator by dispersedly discharging the cool air into a refrigeration compartment and by intensively cooling a predetermined portion of the refrigerator, and a controlling method thereof.

A refrigerator is generally provided with a cooling fan and a cool air dispersing device for forcibly dispersing and circulating cool air, to uniformly cool the air inside. The cooling fan blows cool air flowing in from an evaporator into the freezer compartment and the refrigeration compartment and thus circulates the cool air within each compartment. Here, when a door of the refrigerator is opened, the operation of the cooling fan is discontinued by strategically placing a switch such that it is operated by the door's movement. Also, the cool air dispersing device is commonly installed in the rear wall of the refrigeration compartment, for dispersedly discharging the cool air into the refrigeration compartment via a cool air duct.

As shown in FIG. 1, a conventional refrigerator 10 is partitioned into a freezer compartment 11 and a refrigeration compartment 12, with the compartments being separated by a partition 13 and provided with respective doors 11a and 12a. An evaporator 14 is installed behind the rear wall of freezer compartment 11, for providing cool air by evaporating liquid refrigerant to absorb the heat within the refrigerator, and a cooling fan 15 installed above the evaporator blows the cooled air into both compartments. Situated in front of cooling fan 15, a cool air guide 16 guides the cool air from cooling fan 15 into freezer compartment 11. A cool air duct 17 is provided in the rear wall of refrigerator 10, leading to cool air discharge apertures 17a for dispersedly discharging the cool air into refrigeration compartment 12. Also, reference numeral 13a denotes a cool air vent; reference numeral 18 denotes a compressor for compressing a refrigerant; reference numeral 19 denotes a cool air adjusting damper for adjusting the amount of cool air supplied to refrigeration compartment 12; and reference numeral 20 denotes shelves for holding stored items to be refrigerated, e.g., foodstuffs.

The above conventional refrigerator provides freezing and refrigerating effects by adopting a cooling cycle including a condenser, evaporator, capillary tube and compressor. FIG. 2 is for explaining the basic principle of the cooling cycle.

Referring to FIG. 2, compressor 18 uses heat-insulating compression to convert a low-temperature, low-pressure gaseous refrigerant into a high-temperature and high-pressure state. When the compressed refrigerant is introduced to condenser 21, it condenses due to the surrounding air and thus changes into a liquid state. This high-pressure liquid refrigerant is changed into a low-pressure state, by passing through a long capillary tube 22. The refrigerant is then introduced to evaporator 14, where it undergoes evaporation by absorbing the heat within the refrigerator, to thereby convert back into a low-temperature and low-pressure state and release cool air.

Referring again to FIG. 1, air cooled by the cooling cycle is forcibly pushed by cooling fan 15 and thereby circulates inside the refrigerator. That is, as indicated by arrows, the cool air from evaporator 14 passes cool air duct 17 through the forcible ventilation by cooling fan 15. The cool air is then dispersedly introduced into refrigeration compartment 12 via cool air discharge apertures 17a. After the air entering the refrigeration compartment is exchanged with the air inside, the "old" air is provided to evaporator 14 via cool air ventilation opening 13a formed in partition 13, thereby completing the circulation cycle.

Such a conventional refrigerator generally adopts a shelf-by-shelf discharging method for supplying the cool air to the refrigeration compartment. That is, as shown in FIG. 3, the location of cool air discharge apertures 17a being vertically arrayed in front of cool air duct 17 (see FIG. 1) correspond to the positioning of shelves 20. Thus, the cool air is discharged into every area partitioned by shelves 20. In this case, however, since the cool air is merely discharged forwardly, uniform cooling cannot be achieved so that to severe temperature diversity exists within the compartment.

To overcome this problem, a refrigerator of the three-dimensional cooling type is proposed. As shown in FIG. 4, the three-dimensional cooling, type is characterized in that cool air is discharged not only from cool air discharge apertures 17a formed on the rear wall but also from cool air discharge apertures 47a formed on both side walls. Thus, the cool air, being discharged from three sides, provides for a more even cooling effect. However, the cool air is still simply blasted toward the compartment's interior and not dispersed, so that even temperature distribution is still not attained because those portions of the refrigerator's interior which directly juxtapose the apertures will receive more intense cooling than those which do not.

Moreover, neither of the above refrigerators control the discharging direction or volume of the discharged cool air, so that specified portions of the interior cannot be cooled as required. That is, if a quantity of a warm item is placed in a remote corner of the refrigerator and the cool air does not smoothly circulate within the compartment, the stored item will not be properly refrigerated.

All of these problems become more critical when large-capacity refrigerators are considered.

SUMMARY OF THE INVENTION

To solve the above problems, it is an object of the present invention to provide a cool air discharge controller for evenly controlling the temperature distribution within a refrigerator by dispersedly discharging the cool air into a refrigeration compartment and intensively cooling a specified portion of the refrigerator, and a control method thereof.

To achieve the above object, there is provided a cool air discharge controller for a refrigerator, comprising: a front panel member which is installed at the rear wall of a refrigeration compartment of the refrigerator for providing a plurality of cool air discharge apertures; a rotary cool air discharge member detachably installed onto the front panel member, for dispersedly discharging the cool air into the refrigeration compartment; a driving motor installed at the upper portion of the rotary cool air discharge member for driving the rotary cool air discharge member; a position detecting switch installed at the upper portion of the rotary cool air discharge member, for defining a reference position of the rotary cool air discharge member; a grill cover detachably coupled to the front of the front panel member, for protecting the rotary cool air discharge member and guiding the cool air to be discharged; a thermal insulating member coupled at the rear side of the front panel member, for providing a loading position of a cool air guiding portion of the rotary cool air discharge member and a cool air flowing path; a damper baffle installed at the upper portion of the thermal insulating member, for controlling the amount of the cool air introduced into the refrigeration compartment; and a seal panel member coupled at the rear side of the thermal insulating member, for protecting the thermal insulating member by constituting a housing in cooperation with the front panel member.

To achieve the above object, there is provided a cool air discharge controlling method in a refrigerator, comprising the steps of: (a) detecting a current temperature of a predetermined portion in a refrigeration compartment; (b) searching a table of a temperature change rate per predetermined time lapse, in accordance with a cool air discharge direction at the predetermined portion in the refrigeration compartment; (c) estimating the temperature of the predetermined portion after a predetermined time lapse, in accordance with the cool air discharge direction using the detected current temperature and the temperature change rate table; and (d) determining a cool air discharge direction in which the temperature distribution will be the most uniform, using the estimated temperatures.

To achieve the above object, there is provided a cool air discharge controlling method in a refrigerator, comprising the steps of: detecting a current temperature of a predetermined portion in a refrigeration compartment by a predetermined period; and determining a position in which the current temperature is the highest as a cool air discharge direction.

In the present invention, to evenly distribute the temperature throughout a refrigeration compartment, cool air is dispersedly discharged and the discharging direction in which the temperature distribution is optimum is selected according to an estimated temperature in the refrigeration compartment after a predetermined time lapse, and high-temperature spots are detected and cool air is intensely discharged into those locations.

BRIEF DESCRIPTION OF THE DRAWINGS

The above objects and advantages of the present invention will become more apparent by describing in detail preferred embodiments thereof with reference to the attached drawings in which:

FIG. 1 is a cross-sectional side view showing the inside of a conventional refrigerator;

FIG. 2 is a diagram for explaining the principle of the cooling of a refrigerator;

FIG. 3 is a front view showing the inside of a conventional shelf-by-shelf discharging type refrigerator;

FIG. 4 is a front view showing the inside of a conventional three-dimensional cooling type refrigerator;

FIG. 5 is an exploded perspective view of a cool air discharge controller for a refrigerator according to the present invention;

FIG. 6 is a cross-sectional side view of the cool air discharge controller for a refrigerator according to the present invention;

FIG. 7 is a front view of the cool air discharge controller for a refrigerator according to the present invention;

FIG. 8 is a rear perspective view of a thermal insulating member of the cool air discharge controller for a refrigerator according to the present invention;

FIGS. 9A, 9B and 9C are perspective views of a rotary cool air discharge member of the cool air discharge controller for a refrigerator according to the present invention, and modified examples thereof;

FIG. 10 is a diagram illustrating the arrangement of cool air guiding portion of the cool air discharge apertures in the cool air discharge controller for the refrigerator according to the present invention;

FIG. 11 is a diagram illustrating the cool air guiding portion of the rotary cool air discharge member shown in FIG. 9;

FIGS. 12A, 12B and 12C are diagrams illustrating the arrangement of each cool air guiding portion of the rotary cool air discharge member of the cool air discharge controller for a refrigerator according to the present invention, for left-, center- and right-concentrated cooling, respectively;

FIGS. 13A, 13B and 13C are diagrams illustrating the operation of a position detecting switch;

FIG. 14 is a cross-sectional side view showing the inside of a refrigerator adopting the cool air discharge controller according to the present invention;

FIG. 15 illustrates the dispersing and discharging of cool air in a refrigerator adopting the cool air discharge controller for a refrigerator according to the present invention; and FIG. 16 is a flowchart for explaining the cool air discharge control method according to the present invention.

DETAILED DESCRIPTION OF THE INVENTION

As shown in FIG. 5, a cool air discharge controller 50 according to the present invention, which is installed at the rear wall of a refrigerating compartment of a refrigerator, comprises a front panel member 51 for providing a flowing path of the cool air and a plurality of cool air discharge apertures, a thermal insulating member 52 coupled to the rear side of front panel member 51 and having the same general shape as the front panel member, and a seal panel member 53 coupled to the rear side of thermal insulating member 52.

A rotary cool air discharge member 54 for dispersedly discharging cool air into the refrigeration compartment and a grill cover 55 having a latticed grill 55a for protecting rotary cool air discharge member 54 and guiding the discharge of the cool air are detachably installed onto front panel member 51. A driving motor 56 for driving rotary cool air discharge member 54 and a position detecting switch 57 for detecting the rotational position of rotary cool air discharge member 54 are installed at the upper end of rotary cool air discharge member 54. Here, a geared motor or a stepping motor is used as driving motor 56. Also, position detecting switch 57 is turned on and off by an operating protrusion 57a formed at the upper end of rotary cool air discharge member 54.

Heating lamps 58 for evaporating the water permeated into driving motor 56 and for preventing driving motor 56 from being overcooled are installed beside driving motor 56, and a lamp cover 59 for protecting driving motor 56 and lamps 58 is installed. Reference numeral 56c denotes a case for housing driving motor 56, reference numeral 61c denotes a damper cover, reference numeral 61b denotes a pair of cool air discharge holes which are here slot-shaped, and reference numeral 52g denotes a cool air passage.

As shown in FIG. 6, front panel member 51, thermal insulating member 52 and seal panel member 53 are coupled to form a housing 60 and cool air guide passage 52g for guiding the cool air generated from evaporator 14 (see FIG. 1) to the refrigeration compartment is formed on the upper end of thermal insulating member 52, more exactly, at the upper end of a spacer 63. A damper baffle 61 for controlling the amount of cooled air supplied to the refrigeration compartment by opening or closing cool air guide passage 52g and a damper motor 62 for driving damper baffle 61 are installed in spacer 63. Thus, the upper portion of thermal insulating member 52 where damper baffle 61 and damper motor 62 are installed is thicker than the lower portion thereof. Here, the thickness and width of the upper portion of thermal insulating member 52 are roughly 12 cm and 34 cm, respectively, in the case of the refrigerator of having a capacity of 400–500 l, but may differ according to the overall size of the refrigerator.

A damper cover 61c for protecting the inside of spacer 663 is formed in the front portion thereof. Here, as shown in FIG. 5, damper cover 61c may be formed integrally with front panel member 51 or separately from front panel member 51. Also, cool air discharge hole 61b for discharging the cool air passed through cool air guide passage 52g into a third compartment 173 which is generally placed at the uppermost portion of the refrigeration compartment is formed in the front portion of damper cover 61c.

Meanwhile, the lower portion of housing 60 has a 3 cm thickness and a 25 cm width. This lower portion of housing 60 may be wholly made of a plastic injection-molded substance. However, in the preferred embodiment, this portion is constructed by incorporating a thermal insulator such as 2 mm of Styroresin into front panel member 15 made of a injection-molded plastics.

A rotary cool air discharge member 54 is installed at the lower portion of housing 60, while being constructed of a cool air guiding portion 54a (see FIGS. 9A, 9B and 9C) and a supporting member 54b. Three or four cool air guiding portions 26a are connected to support portion 54b in a body and each cool air guiding position is arranged in correspondence with each space partitioned by each shelf.

Housing 17 is installed at the rear wall of the refrigeration compartment as an assemble body. Here, it is preferable that front panel member 51 of housing 60 is formed at the same surface as the rear wall of the refrigeration compartment. That is, in the state where the united body of front panel member 51 and thermal insulating member 53 is attached on seal panel member 53, rotary cool air discharge member 54 and grill cover 55 are assembled to front panel member 51, and driving motor 56 and lamp 58 which are assembled each other are installed at the rear wall of the refrigeration compartment as shown in FIG. 7. Thus, the assembling process is very simple compared with the case in which each part is separately installed to the refrigeration compartment. A screw coupling portion 60a is for installing this kind of housing 60.

Also, as shown in FIG. 8, a cool air passage 60f for guiding the cool air generated from evaporator 14 (see FIG. 1) to the refrigeration compartment and a cool air discharge aperture 60h are formed in thermal insulating member 52. That is, cool air passage 60f is formed at the rear wall of thermal insulating member 52 along the longitudinal direction thereof and cool air discharge aperture 60h is formed while passing through thermal insulating member 52 to communicate cool air passage 60f with the refrigeration compartment. A plurality of cool air discharge apertures 60 are vertically arranged at the center of thermal insulating member 52 and cool air passage 60f includes a first passage portion 65 and a second passage portion 66 which are formed at either side of cool air discharge apertures 60h. Here, like cool air guiding portion 54a of rotary cool air discharge member 54, plural cool air discharge apertures 60h are vertically arranged corresponding to each space partitioned by shelves 8. Accordingly, cool air guiding portion 54a is arranged in cool air discharge apertures 60h.

Also, the upper portions of first and second passage portions 65 and 66 are extended upward to be placed at the both sides of cool air guide passage 52g and the lower portions thereof are extended toward a crisper 174 (see FIG. 14) to be connected each other. Thus, the cool air passed through cool air guide passage 52g is dispersed to the left and right by the opening of damper baffle 61 and then discharged into refrigeration compartment 162 and crisper 174 along first and second passage portions 65 and 66. Also, part of cool air is discharged into third compartment 173 via cool air discharge hole 61h (see FIG. 6). Cool air passage 60f for guiding the cool air flowing down to refrigeration compartment 162 comprises a first linking path 67 for connecting first passage portion 65 and cool air discharge aperture 60h and a second linking path 68 for connecting second passage portion 66 and cool air discharge aperture 60h. Thus, the cool air flowing along first and second passage portions 65 and 66 is partially guided to first and second linking paths 67 and 68 and then discharged into refrigeration compartment 162 via cool air discharge aperture 60h.

Here, first and second linking paths 67 and 68 have wide inlets connected to each first and second passage portions 65 and 66 and narrow outlets each connected to cool air discharge aperture 60h. particularly, the upper sides of the inlets of first and second linking paths 67 and 68 have a round shape and the lower sides thereof are more outwardly extended than the upper sides due to flanges 81, 82 and 83, so that the cool air flowing into the lower direction is smoothly introduced to first and second linking paths 67 and 68 along the rounded portion while the cool air is partially blocked by flanges 81, 82 and 83. Also, it is preferable that the upper sides of each cool air discharge aperture 60h, forming the inlets of first and second linking paths 67 and 68, are rounded larger at the lower portions of first and second linking paths 67 and 68 than the upper portions thereof, and flanges 81, 82 and 83 formed at the lower sides of each cool air discharge aperture 60h are outwardly extended wider at the lower portions of first and second linking paths 67 and 68 than the upper portions thereof. This construction is for discharging much cooled air into refrigeration compartment 162 via first and second linking paths 67 and 68 and cool air discharge aperture 60h at the lower portion. Thus, even if the temperature of the cool air which is first discharged and occupies the lower quarters of a compartment is generally high, a temperature deviation according to the height of the refrigeration compartment is removed, to thereby evenly cool the temperature within the refrigeration compartment. Also, a cool air limiting projection 48 having a predetermined height is placed at the lowermost flange 83 forming an inlet of first and second linking paths 67 and 68, so that the amount of cool air supplied to crisper 174 (see. FIGS. 14 and 15) decreases and the amount of cool air discharged into refrigeration compartment 162 via cool air discharge aperture 60h increases. Thus, refrigeration compartment 162 is controlled at a lower temperature than crisper 174.

In order to disperse the cool air discharged into refrigeration compartment 162 to the left and right, cool air discharge aperture 60h comprises a first discharging portion 69 and a second discharging portion 70 which eccentrically communicate with each other with different depths. That is, first discharging portion 69 is disposed near first linking path 67, while second discharging portion 70 is disposed near second linking path 68. Thus, the cool air introduced into first and second discharging portions 69 and 70 is discharged into opposite directions so that the cool air is dispersed within refrigeration compartment 162. Also, it is preferable that the positions of first and second discharging portions 69 and 70 are opposite to those of the adjacent cool air discharge apertures 60h. That is, when first discharging portion 69 is placed higher than second discharging portion 70 in the upper cool air discharge aperture 60h, first discharging portion 69 is placed lower than second discharging portion 70 in the middle cool air discharge aperture 60h. Thus, since the temperature of earlier discharged air which drops down into the lower areas of the compartment is generally higher than that of the cool air which is discharged later, when the temperature of the cool air introduced from the right is lower than that from the left in the upper cool air discharge aperture, the cool air of lower temperature is introduced into the left side of the middle cool air discharge aperture, so that the temperature deviation between the right and left of the refrigerator is removed, thereby evenly cooling the air within the refrigeration compartment.

Rotary cool air discharge member 54 adopted in the present invention and examples modified therefrom will be described with reference to FIGS. 9A, 9B and 9C. As shown in FIGS. 9A, 9B and 9C, rotary cool air discharge member 54 is composed of a plurality of cool air guiding portions 54a and supporting member 54b. Cool air guiding portions 54a comprises an upper plate 91, a middle plate 92 and a lower plate 93 which are spaced apart from each other by a predetermined distance in a disk shape with a predetermined thickness and diameter, and first and second dispersion guiding blades 94 and 95 which are integrally installed between upper, middle and lower plates so as to disperse the cool air. Here, the diameter of these three plates roughly correspond to the width of cool air discharge aperture 60h, for maximally preventing the leakage of the cool air. In order to prevent supporting member 54b from being bent when rotary cool air discharge member 54 rotates in coupled with driving motor 56, the cross-section of supporting member 54b is formed with "T" shape.

According to a preferred embodiment of the present invention, rotary cool air discharge member 54 is constructed by integrally connecting four cool air guiding portions 54a and supporting member 54b. Here, the third cool air guiding portion from the top is false and is not directly related to the discharge of the cool air since there is no cool air discharge aperture 60h formed at the corresponding position. However, the cool air which leaks through chinks between cool air discharge aperture 60h and cool air guiding portion 54a is dispersed by false cool air guiding portion 96. Also, cool air discharge portions 54a have a balanced arrangement due to the presence of false cool air guiding portion 96, thereby improving the general appearance of the interior of the refrigerator.

As shown in FIG. 9B, rotary cool air discharge member 54 is constructed to be detachable, comprising an upper member 54u in which upper and middle cool air guiding portions 121 and 122 are placed while being connected by supporting member 54b, and a lower member 54d in which false and lower cool air guiding portions 96 and 123 are placed. This is for solving a problem related with a metal molding process. That is, when first and second dispersion guiding blades 94 and 95 of each cool air guiding portion are arranged in an angle different from each other, the cool air guiding portions cannot be molded at the same time. Two cool air guiding portions 54a whose dispersion guiding blades are perpendicular to each other are placed in upper member 54u and the cool air guiding portions whose dispersion guiding blades form the same angle are placed in lower member 54d. FIG. 9C shows a modified rotary cool air discharge member 54 without false cool air guiding portion 96.

As described above, each cool air guiding portion is placed at each cool air discharge aperture 60h (see FIG. 5) and the positions of cool air guiding portion 54a and cool air discharge aperture 60h correspond to the space partitioned by shelve 8 of the refrigeration compartment. As shown in FIG. 10, middle plate 92 of cool air guiding portion 54a is located at the boundary between first and second discharging portions 69 and 70 of cool air discharge aperture 60h, and upper and lower plates 91 and 93 are situated corresponding to the positions of first and second discharging apertures 69 and 70. As a result, upper and middle plates 91 and 92, and middle and lower plates 92 and 93 form an extra passage extended from first and second linking paths 67 and 68 together with first and second dispersion guiding blades 94 and 95 formed therebetween, so that the cool air is guided to the refrigerator to be evenly distributed into the refrigerator. That is, upper, lower and middle plates 91, 92 and 93 guide the cool air which is passed through first and second linking paths 67 and 68 from first and second passage portions 65 and 66 to be discharged into the refrigerator while being preventing the cool air from descending to the lower direction. Thus, even at a low-speed rotation of rotary cool air discharge member 54, the above three plates adequately collect the introduced cool air for discharge into the refrigerator.

As shown in FIG. 11, first and second dispersion guiding blades 94 and 95 each having a symmetrical structure are also vertically symmetrical with respect to each other. That is, first and second dispersion guiding blades 94 and 95 has concave portions 94a and 95a and convex portions 94b and 95b which are continuously formed in an "S" shape, thereby forming symmetrical structure. Since first and second dispersion guiding blades 94 and 95 are formed in "S" shape, airflow resistance is decreased so that the cool air flowing along first and second dispersion guiding blades 94 and 95 via cool air discharge aperture 60h can smoothly circulate.

As shown in FIG. 12, on the basis of first and second dispersion guiding blades 94 and 95 of the upper cool air guiding portion 121, middle cool air guiding portion 122 is installed for first and second dispersion guiding blades 94 and 95 thereof to be formed at 90° with respect to first and second dispersion guiding blades 94 and 95 of upper cool air guiding portion 121, and false cool air guiding portion 96 and lower cool air guiding portion 123 are installed for first and second dispersion guiding blades 94 and 95 thereof to be formed at 45° with respect to first and second dispersion guiding blades 94 and 95 of middle cool air guiding portion 122.

Due to the above-described arrangement of the upper, middle and lower cool air guiding portions, the position against which the cool air is run and the flowing direction of the cool air are different in first and second dispersion guiding blades of each cool air guiding portion, so that there is provided an effect of distributing the load applied to driving motor 56 (see FIG. 5). If all dispersion guiding blades of each cool air guiding portion are placed at the same angle, when rotary cool air discharge member 54 rotates, the cool air collides with all dispersion guiding blades simultaneously and thus a considerable load is applied to driving motor 54. Therefore, according to the preferred embodiment of the present invention, since first and second dispersion guiding blades 94 and 95 of the upper, middle and lower cool air guiding portions are arranged at the different angle, driving motor 54 is not overloaded.

Also, the above-described arrangement of the upper, middle and lower cool air guiding portions provide a concentrative cooling effect in that an arbitrary portion in the refrigeration compartment can be intensively cooled. This concentrative cooling can be performed by controlling the rotation of driving motor 54. FIGS. 12A, 12B and 12C show the left-concentrated, central-concentrated and right-concentrated cooling processes, respectively.

The structure and operating state of position detecting switch 57 for determining a reference position of rotary cool air discharge member 54, and an operating protrusion 57a therefor, are shown in FIGS. 13A, 13B and 13C.

Operating protrusion 57a operates in sequence as shown in FIGS. 13A, 13B and 13C, while rotating in an arrow direction together with rotary cool air discharge member 54. FIG. 13C shows a moment when contact between position detecting switch 57 and operating protrusion 57a is lost. According to the preferred embodiment, the position of rotary cool air discharge member 54 on the above contact-lost moment is set as a reference position thereof. Also, it is preferable that an end portion of operating protrusion 57a, contacting with a switching lever 57s of position detecting switch 57, has a streamlined shape. As a result, a sudden separation of position detecting switch 57 from operating protrusion 57a is prevented, so that noise is not generated during the contact separation.

The operating and controlling methods of the cool air discharge controller having the above structure according to the present invention will be described as follows with reference to FIGS. 14 to 16.

FIG. 14 is a vertical cross-sectional view showing the inside of the refrigerator adopting the cool air discharge controller according to the present invention.

Here, since each portion of the refrigeration is already described, the description with respect to each portion of the refrigerator will be omitted.

First, when starting compressor 11a and evaporator 12 according to the above described freezing cycle (see FIG. 2), evaporator 12 generates the cool air through a thermal exchange with the air of the circumstance. The generated cool air is supplied to freezer compartment 161 and refrigeration compartment 162 by the operation of cooling fan 165 as directed by the arrows of FIG. 14. The opening and closing operations of damper baffle 61 are controlled according to the temperature of refrigeration compartment 162. When damper baffle 61 is opened, the cool air is supplied to refrigeration compartment 162 via cool air guide passage 52g. That is, the cool air passed through cool air guide passage 52g is dispersed into the left and right and then discharged into refrigeration compartment 162 and crisper 174 via first and second passage portions 65 and 66 (see FIG. 8). Part of cool air is discharged into third room 173 via cool air discharge hole 61b (see FIG. 6).

Hereinafter, the process of discharging cool air into refrigeration compartment 162 will be described in detail.

The cool air flowing along first and second passage portions 65 and 66 is partially introduced into first and second linking paths 67 and 68 in sequence from the upper portion and then discharged via cool air discharge aperture 60h. Here, the cool air is discharged while being dispersed into the left and right directions by the rotation of cool air guiding portion of rotary cool air discharge member 54 located in front of cool air discharge aperture 60h. Even if there is no cool air guiding portion 54a, first and second discharging portions 69 and 70 which compose cool air discharge aperture 60h have the different depths in the vertical direction to be eccentrically disposed to the cool air inflow direction, so that the discharged cool air can be dispersed to the left and right. However, the dispersion of the cool air can be accelerated by the rotation of cool air guiding portion 54a. Thus, the interior of the refrigerator is evenly cooled.

Even if the refrigeration compartment is evenly cooled, when much foodstuff is stored in a predetermined portion or warm foodstuff is placed in a predetermined portion, the evenly cooled condition of the refrigeration compartment is no longer maintained. Also, it is difficult to achieve the evenly cooled condition even if cool air guiding portion 54a rotates. In order to solve this problem, a concentrative cooling process with respect to a predetermined portion is required. The concentrative cooling process according to the present invention will be described with reference to FIGS. 12A, 12B and 12C.

First, when the left side of the refrigeration compartment should be concentrically cooled, as shown in FIG. 12A, rotary cool air discharge member 54 is fixed while cool air guiding portion 54a rotates for mainly discharging the cool air into the left. Accordingly, the cool air is mainly discharged into the left side under the guidance of first and second dispersion guiding blades 94 and 95 of middle cool air guiding portion 122. Also, when the center of the refrigeration compartment should be concentrically cooled, as shown in FIG. 12B, rotary cool air discharge member 54 is fixed while cool air guiding portion 54a rotates for mainly discharging the cool air into the center of the refrigeration compartment. Accordingly, the cool air is mainly discharged into the center under the guidance of first and second dispersion guiding blades 94 and 95 of middle cool air guiding portion 122. In addition, when the right side of the refrigeration compartment should be concentrically cooled, as shown in FIG. 12C, rotary cool air discharge member 54 is fixed while cool air guiding portion 54a rotates for mainly discharging the cool air into the right of the refrigeration compartment. Accordingly, the cool air is mainly discharged into the right side under the guidance of first and second dispersion guiding blades 94 and 95 of middle cool air guiding portion 122. Here, the rotating and stopping operations of rotary cool air discharge member 54 are controlled by position detecting switch 57 turned on and off by operating protrusion 57a, driving motor 56 and a controller (not shown) electrically connected with position detecting switch 57 and driving motor 56.

Referring to FIG. 16, a preferred embodiment of a cool air discharge control method applied to the cool air discharge controller according to the present invention will be described, wherein a cool air discharge direction is preset by estimating the interior state of the refrigeration compartment after a predetermined time lapse, so as to evenly distribute the inner temperature of the refrigeration compartment, together with the above controlling method.

In FIG. 16, first, a table of a temperature change rate per predetermined time lapse (say, one minute) at a predetermined portion of the refrigeration compartment is checked ahead and then the obtained table of the temperature change rates $\Delta S_1$, $\Delta S_2$, $\Delta S_3$ and $\Delta S_4$ are stored in a memory of a controlling portion. Then, current temperatures $S_1$, $S_2$, $S_3$ and $S_4$ of the predetermined portions in the refrigeration compartment are measured (step S181). Then, the table of the temperature change rates $\Delta S_1$, $\Delta S_2$, $\Delta S_3$ and $\Delta S_4$ of predetermined portion according to the cool air discharge direction, which are previously stored in the memory of the controlling portion, are searched from the controlling portion (step S182). Thereafter, temperature change rates $\Delta S_1$, $\Delta S_2$, $\Delta S_3$ and $\Delta S_4$ are added to current temperatures $S_1$, $S_2$, $S_3$ and $S_4$, respectively, so that temperatures $T_1$, $T_2$, $T_3$ and $T_4$ in the refrigeration compartment after a predetermined time lapse are estimated according to the cool air discharge direction (step S183).

Then, maximum and minimum values from the above estimated temperatures $T_1$, $T_2$, $T_3$ and $T_4$ are chosen and then a modulus of the difference between maximum and minimum values is obtained (step S184) and then it is determined whether the modulus is calculated with respect to all cool air discharge directions (step S185). If the moduli with respect to all cool air discharge directions are not calculated, the cool air discharge direction is changed (step S187) and then the process returns to step S183. However, if the modulus is calculated with respect to all cool air discharge directions, a cool air discharge direction in which the temperature distribution is the most uniform is selected (step S186). That is, a cool air discharge direction having the least modulus of the difference between maximum and minimum values from estimated temperatures $T_1$, $T_2$, $T_3$ and $T_4$ is selected and then stored in the controlling portion. When the cool air discharge direction is determined, the cool air discharge direction may differ according to the shelf of the refrigeration compartment and may the same in each shelf thereof.

After a predetermined time lapse, driving motor 56 operates so that cool air guiding portion 54a is fixed toward a predetermined direction according to the stored cool air discharge direction. Accordingly, the cool air is properly dispersed and discharged into the refrigeration compartment according to the discharging direction under the guidance of first and second dispersion guiding blades 94 and 95 of cool air guiding portion 54a. As a result, the temperature in the refrigeration compartment can be evenly maintained.

As another preferred embodiment for achieving the object according to the present invention, the following method may be adopted. That is, first, the current temperatures at predetermined portions in the refrigeration compartment is detected in a predetermined period. Then, the cool air discharge direction is determined for intensively discharging the cool air into a portion in which the temperature is the highest among the detected temperatures. As a result, uneven temperature distribution in the refrigeration compartment, caused from a cool air supply shortage in a predetermined portion, can be prevented. Also, in the same manner as the first preferred embodiment, according to the second preferred embodiment, the cool air discharge direction may differ according to the shelf of the refrigeration compartment and may the same in each shelf thereof.

As described above, in the cool air discharge controller for a refrigerator and the controlling method thereof according to the present invention, the cool air is dispersedly discharged by the rotary cool air discharge member. In addition, the cool air discharge direction is controlled by estimating the temperature in the refrigeration compartment after a predetermined time lapse and by previously setting a cool air discharge direction in which the temperature distribution is the most uniform. Also, the cool air is intensively discharged into the portion with the highest temperature in the refrigeration compartment. Therefore, the temperature within the refrigeration compartment can be evenly maintained.

What is claimed is:

1. A cool air discharge controlling method in a refrigerator, comprising the steps of:

(a) detecting a current temperature of a predetermined portion in a refrigeration compartment;

(b) searching a table of a temperature change rate per predetermined time lapse, in accordance with a cool air discharge direction at the predetermined portion in the refrigeration compartment;

(c) estimating the temperature of the predetermined portion after a predetermined time lapse, in accordance with the cool air discharge direction using said detected current temperature and said temperature change rate table; and (d) determining a cool air discharge direction in which the temperature distribution will be the most uniform, using said estimated temperatures.

2. A cool air discharge controlling method as claimed in claim 1, wherein said determined direction differs according to each shelf of the refrigeration compartment.

3. A cool air discharge controlling method as claimed in claim 1, wherein said determined direction is the same in each shelf of the refrigeration compartment.

4. A cool air discharge controlling method as claimed in claim 1, wherein said step (d) comprises the steps of:

calculating a modulus of the difference between maximum and minimum values of said estimated temperatures;

determining whether said modulus is calculated with respect to all cool air discharge directions; and returning to said step (c) by changing the cool air discharge direction when said modulus is not calculated with respect to said all cool air discharge directions.

5. A cool air discharge controlling method in a refrigerator, comprising the steps of:

detecting a current temperature of predetermined portions in a refrigeration compartment in a predetermined period; and determining as a cool air discharge direction a direction corresponding to a portion in said refrigeration compartment in which the current temperature is the highest;

wherein, at certain times of operation, said cool air discharge direction differs according to each shelf of the refrigeration compartment and wherein, at other times of operation, said cool air discharge direction is the same in each shelf of the refrigeration compartment.

* * * * *